(12) United States Patent
Kuscher et al.

(10) Patent No.: US 10,218,567 B2
(45) Date of Patent: Feb. 26, 2019

(54) GENERATING AN IDENTIFIER FOR A DEVICE USING APPLICATION INFORMATION

(71) Applicant: Google Inc., Mountain View, CA (US)

(72) Inventors: Alexander F. Kuscher, San Francisco, CA (US); Brian Chu, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/274,022

(22) Filed: Sep. 23, 2016

(65) Prior Publication Data

US 2017/0012817 A1 Jan. 12, 2017

Related U.S. Application Data

(62) Division of application No. 13/692,786, filed on Dec. 3, 2012, now Pat. No. 9,477,635.

(51) Int. Cl.
*G06F 8/65* (2018.01)
*H04L 12/24* (2006.01)
(Continued)

(52) U.S. Cl.
CPC ............ *H04L 41/0803* (2013.01); *G06F 8/71* (2013.01); *G06F 15/177* (2013.01); *H04L 67/02* (2013.01);
(Continued)

(58) Field of Classification Search
CPC ............... H04L 29/06; H04L 29/08072; H04L 29/08981; H04L 41/0806; H04L 41/12; H04L 63/0428; H04L 12/24; H04L 29/08; H04L 41/0803; H04L 67/02; H04L 21/4405; G06F 21/10; G06F 17/30949; G06F 17/30067; G06F 17/30516; G06F 17/30864; G06F 17/30985; G06F 8/65; G06F 8/71; G06F 15/177; H04N 21/4405; H04W 8/24; G04L 67/146; G11B 20/0021; G11B 20/00086
(Continued)

(56) References Cited

U.S. PATENT DOCUMENTS

2010/0228736 A1   9/2010   Kahlbaum et al.
2010/0281475 A1   11/2010  Jain et al.
(Continued)

OTHER PUBLICATIONS

IBM Corporation, "z/OS V1 R12.0 Communications Server IP Configuration Guide SC31-8775-17—Telnet configuration data set customization details," pp. 1-46, 2010.
(Continued)

*Primary Examiner* — Robert B Harrell
(74) *Attorney, Agent, or Firm* — Foley & Lardner LLP

(57) ABSTRACT

A computer-implemented method for generating an identifier for a device includes identifying one or more applications from a plurality of applications installed on a device; generating an identifier for the device based on the one or more identified applications; and providing the generated identifier as identification for the device. Another computer-implemented method for identifying a device includes: receiving information that indicates one or more applications of a plurality of applications installed on a device; and identifying the device using the received information.

17 Claims, 4 Drawing Sheets

(51) Int. Cl.
*G06F 15/177* (2006.01)
*G06F 8/71* (2018.01)
*H04L 29/08* (2006.01)
*H04W 8/24* (2009.01)

(52) U.S. Cl.
CPC ............. *H04L 67/146* (2013.01); *H04W 8/24* (2013.01); *G06F 8/65* (2013.01)

(58) Field of Classification Search
USPC .............................. 707/747; 709/220; 726/26
See application file for complete search history.

(56) References Cited

U.S. PATENT DOCUMENTS

| | | |
|---|---|---|
| 2010/0332996 A1 | 12/2010 | Sarkaria |
| 2011/0288932 A1 | 11/2011 | Marks et al. |
| 2011/0321167 A1* | 12/2011 | Wu .................... G06F 21/6245 726/26 |

OTHER PUBLICATIONS

Notice of Allowance for U.S. Appl. No. 13/692,786 dated Jul. 11, 2016.
Office Action on U.S. Appl. No. 13/692,786 dated Jan. 4, 2016.
Office Action on U.S. Appl. No. 13/692,786 dated May 8, 2015.
Office Action on U.S. Appl. No. 13/692,786 dated Sep. 9, 2014.

\* cited by examiner

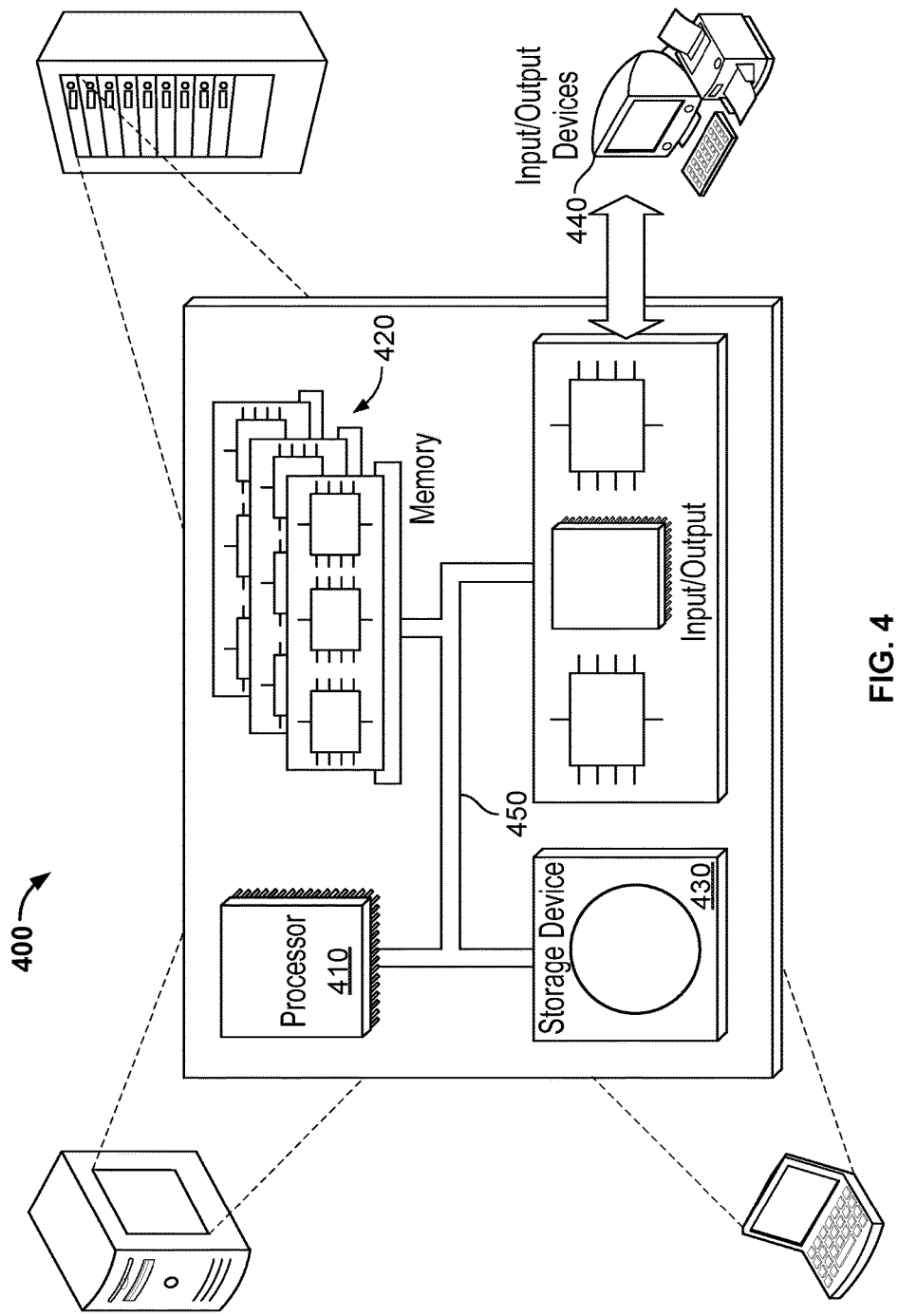

GENERATING AN IDENTIFIER FOR A DEVICE USING APPLICATION INFORMATION

RELATED APPLICATIONS

The present application claims priority to and is a divisional of U.S. patent application Ser. No. 13/692,786 titled "GENERATING AN IDENTIFIER FOR A DEVICE USING APPLICATION INFORMATION" filed on Dec. 3, 2012, and now granted as U.S. Pat. No. 9,477,635, the entirety of which is hereby incorporated by reference.

BACKGROUND

Cookies are used by some browsers, applications and other programs to keep track of activities in a network. Some operating systems provide sandboxing that may affect users' browsing behaviors. For example, embedded browsers (bundled with the operating system) are quarantined from the system and the only low-level access is to download attachments to be temporarily consumed by a read-only view. Mobile applications published by third parties generally run unprivileged on the device and only have access to their own respective sandbox for persisting data. Simultaneous processes are sometimes discouraged to simplify task management and restrict battery usage. Sometimes, the above cause user content consumption to be fragmented among multiple applications. As a result, events that are part of a single session can appear unrelated.

SUMMARY

In a first aspect, a computer-implemented method for generating an identifier for a device includes identifying one or more applications from a plurality of applications installed on a device; generating an identifier for the device based on the one or more identified applications; and providing the generated identifier as identification for the device.

Implementations can include any or all of the following features. The identification includes determining at least a name of the one or more applications, and generating the identifier includes hashing the determined name. The method further includes determining package versions of the one or more applications and using the determined package versions in generating the identifier. The method further includes determining an installation order of the one or more applications and using the determined installation order in generating the identifier. The method further includes determining installation dates of the one or more applications and using the determined installation dates in generating the identifier. The method further includes determining a clock skew of the device and using the determined clock skew in generating the identifier. The one or more applications includes all of the plurality of applications installed on the device. The method further includes subsequently determining addition or removal of an application on the device, generating a new identifier based on the determination, and providing the generated new identifier. The method further includes indicating that the generated new identifier replaces the generated identifier.

In a second aspect, a computer program product is tangibly embodied in a computer-readable storage medium and includes instructions that when executed by a processor perform a method for generating an identifier for a device. The method includes identifying one or more applications from a plurality of applications installed on a device; generating an identifier for the device based on the one or more identified applications; and providing the generated identifier as identification for the device.

In a third aspect, a computer-implemented method for identifying a device includes: receiving information that indicates one or more applications of a plurality of applications installed on a device; and identifying the device using the received information.

Implementations can include any or all of the following features. The information includes at least names of the one or more applications, and the method further includes hashing the determined names, wherein identifying the device includes comparing a hash result with a known identifier. The information also indicates package versions of the one or more applications that are used in the hashing. The information also indicates an installation order of the one or more applications, and the installation order is used in the hashing. The information also indicates installation dates of the one or more applications, and the installation dates are used in the hashing. The information also indicates a clock skew of the device, and the clock skew is used in the hashing. The one or more applications includes all of the plurality of applications installed on the device. The hash result is a new identifier for the device, and the method further includes substituting the new identifier for an earlier identifier for the device. The method further includes subsequently generating a reset identifier for the device after changes in what applications are installed on the device.

In a fourth aspect, a computer program product is tangibly embodied in a computer-readable storage medium and includes instructions that when executed by a processor perform a method for generating an identifier for a device. The method includes: receiving information that indicates one or more applications of a plurality of applications installed on a device; and identifying the device using the received information.

Implementations can provide any or all of the following advantages. A device identifier can be generated based on information about which applications or packages are installed on the device. A device can generate a unique identifier based on its application installations, and the identifier can be forwarded without revealing the identities of the applications. A robust and flexible fingerprinting technique for devices can be used to identify separate events that are related to each other, for example because the events were generated by different applications during a common browsing session.

The details of one or more implementations are set forth in the accompanying drawings and the description below. Other features and advantages will be apparent from the description and drawings, and from the claims.

DESCRIPTION OF DRAWINGS

FIG. 4 is a block diagram of a computing system that can be used in connection with computer-implemented methods described in this document.

DETAILED DESCRIPTION

This document describes examples of generating an identifier for a device (e.g., a smartphone, tablet or personal computer, etc.) using information about applications installed on the device. In some implementations, a device can generate a list of its currently installed applications or other packages, and from that list an identifier unique to that device can be generated. For example, such an identifier can serve as identification for the device during network activities.

Figure 1:
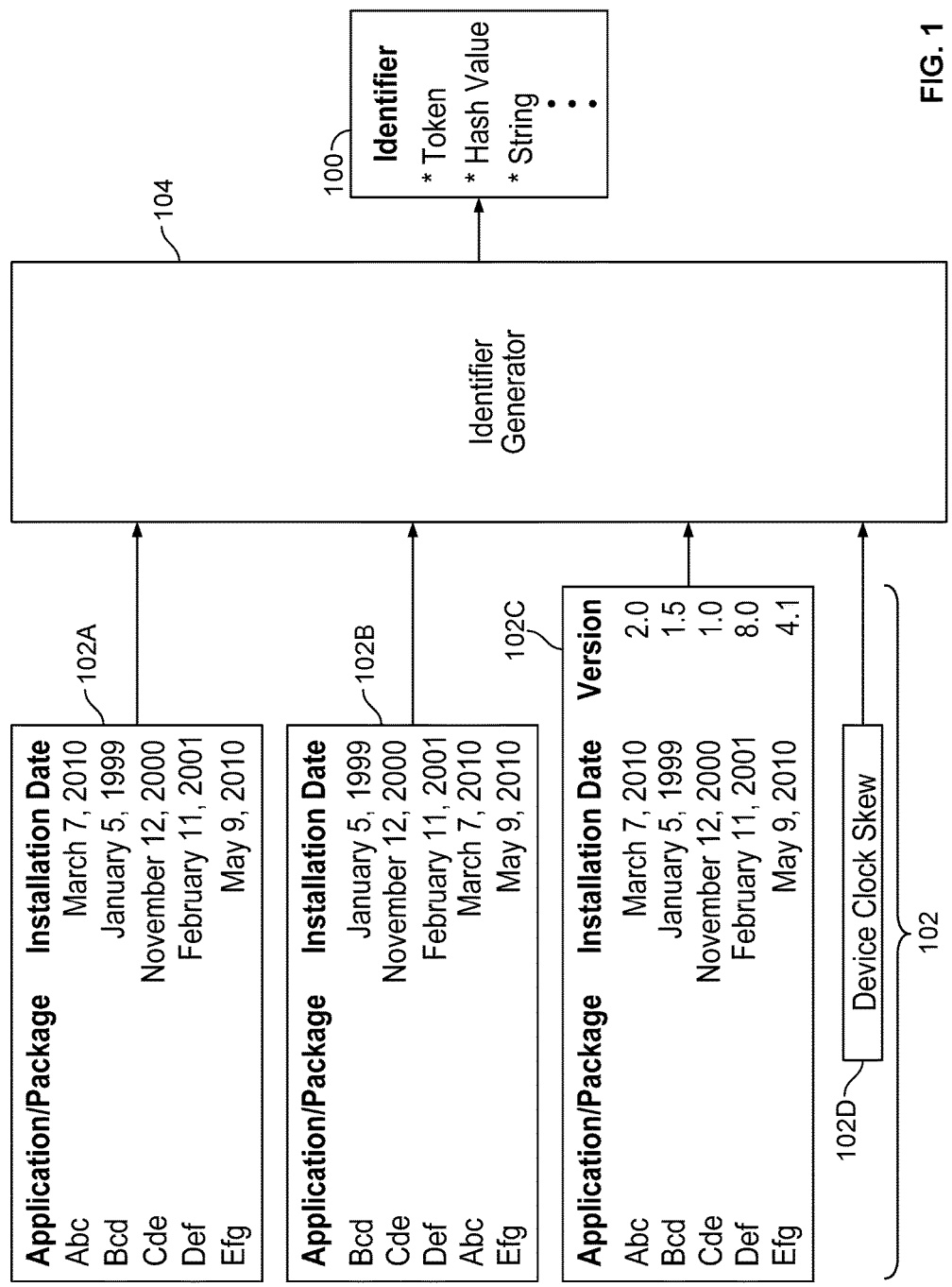
FIG. 1 schematically shows an identifier being generated from information.

FIG. 1 schematically shows an identifier 100 being generated from one or more portions of information 102. The information 102 here includes alphanumerically sorted information 102A, chronologically sorted information 102B, information 102C that includes a version number, and information 102D that indicates a clock skew for a particular device. Any or all of the portions of information 102 can be identified by the device and then be processed, by the device itself or another system, to create the identifier 100.

One or more portions of the information 102 is provided to an identifier generator 104 that processes the information to generate the identifier 100. For example, the identifier 100 can include a token hash value and/or other string that serves to uniquely identify the device to which the information 102 relates.

The information 102A indicates multiple applications or packages, here named Abc, Bcd, Cde, Def and Efg for simplicity. In some implementations, the identified applications/packages may be programs or other software, some of which has been downloaded or otherwise installed on the device by a user, and some of which may have been preinstalled by the device manufacturer. Any kind of applications can be included, such as browsers, multimedia players, email clients, instant-messaging applications, social-networking applications, games, apps, utility programs, diagnostic tools, antivirus programs, word processors, office software, videoconferencing applications or cloud service applications, to name just a few examples.

Any number of applications or packages can be indicated by the information 102A. In some implementations, the information 102A indicates the complete set of installed applications or packages on the device. In other implementations, only a subset of the installed contents are included in the list. For example, only content installed before a certain cutoff date, or only content larger than a certain size, may be included.

The information 102A is currently sorted in alphanumerical order. That is, the applications or packages are sorted in order of their names. One or more other types of data may also be included in the information 102A. For example, installation dates are here indicated for each application/package.

When the information 102A is processed by the identifier generator 104, optionally in combination with other information, the identifier 100 can be generated. In some implementations, a hash function is applied to the information 102A to generate a unique hash result that is specific to the contents of the information 102A. For example, the application/package names can be processed in the current order (optionally together with the installation dates and/or other information) to generate the identifier.

Turning now to the information 102B, it also indicates names of applications/packages installed on the device. However, the information is sorted by installation date. For example, this causes the names to be listed in a different order than in the information 102A. When the chronologically listed names of the information 102B (optionally together with the installation dates and/or other information) are provided to the identifier generator 104, a different identifier 100 is generated than in the previous example. That is, the different order of the application/package names causes a different identifier to be generated. For example, this can help avoid identifier collisions, in which two different devices would be assigned the same identifier.

The information 102C indicates application/package names, installation dates and also version numbers for the respective package/application. In some implementations, the version numbers are taken into account to distinguish two or more devices from each other based on a difference in the version numbers of the installed contents. When versioning information is taken into account, one or more other types of information (e.g., installation dates) can also be considered. As another example, the order in which the application/package names are sorted (e.g., in alphanumeric order in the information 102C) can also be taken into account by the identifier generator 104.

The device clock skew 102D can indicate how the time shown by a clock in the device differs from some reference clock. In some implementation, another clock in the same network as the device can be referenced. For example, a clock in the system that operates the identifier generator 104 can be used as a reference. By combining the clock skew 104D with some information about the applications/packages installed on the device (e.g., any of the information portions 102A, B or C) the identifier 100 can be generated uniquely for this particular device.

Figure 2:
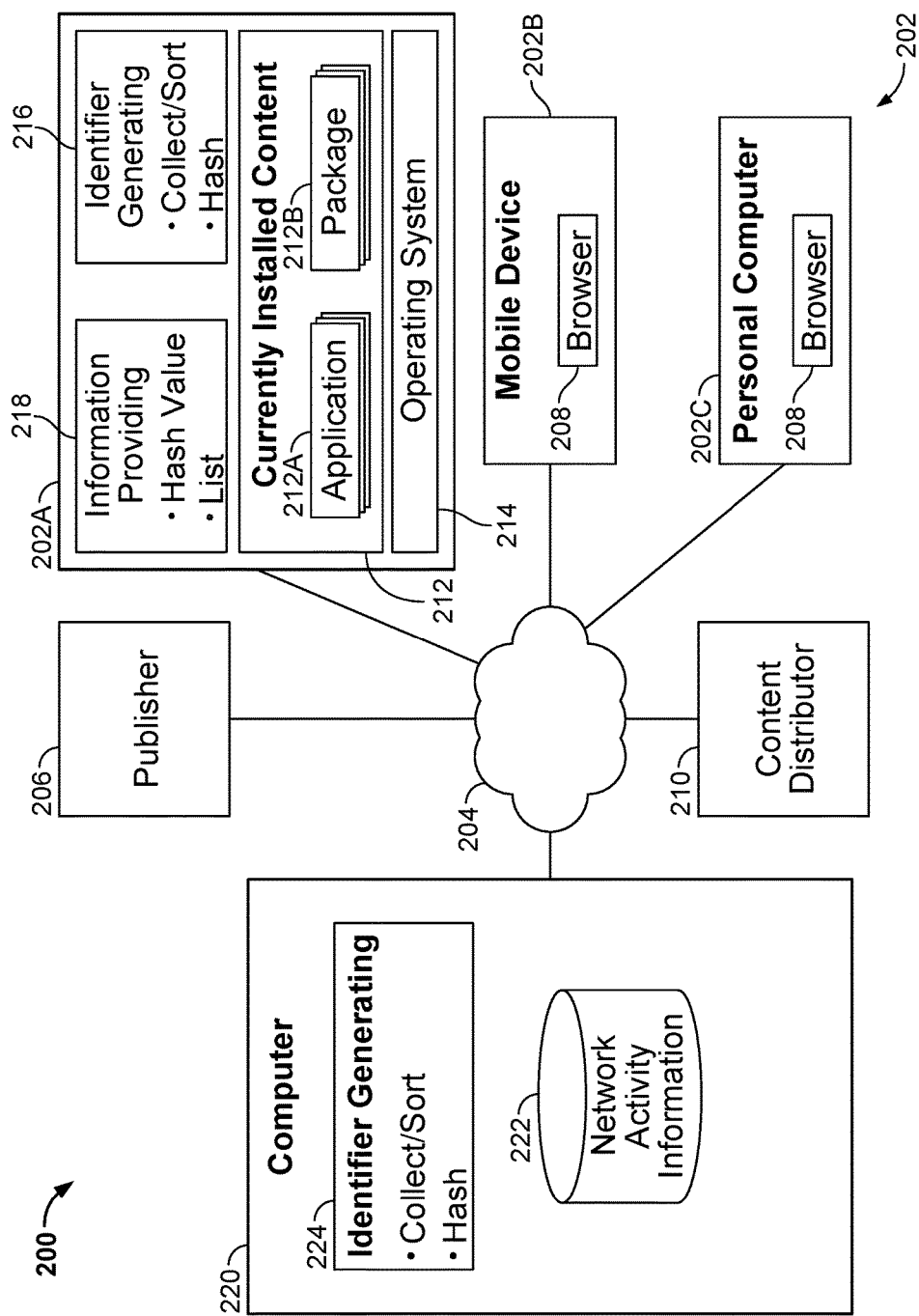
FIG. 2 shows an example of a system that can be used for generating an identifier for a device.

FIG. 2 shows an example of a system 200 that can be used for generating an identifier for a device. The identifier can be generated locally on the device to which it applies or at a location other than on the device.

The system 200 here includes multiple user devices 202 that are connected by any kind of network 204 (e.g., a local network or the internet) to one or more other devices and systems. Any suitable kind of user devices 202A-C can be included. For example, the user device 202B is here a mobile device, such as a smartphone, tablet or other handheld device. As another example, the user device 202C is here a personal computer, such as a laptop or desktop computer.

The system 200 can include one or more publisher systems 206 connected to the network 204 and/or to the user devices 202. In some implementations, the publisher system 206 includes one or more web servers. For example, the publisher system 206 can make content available to the user devices 202, such as in form of one or more (web) pages that can be viewed and manipulated in a browser 208 or other program.

The system 200 can include one or more content distributor systems 210 connected to the network 204, to the user devices 202 and/or to the publisher system 206. In some implementations, the system 210 provides additional information or other content for one or more content portions provided by the publisher system 206. For example, the system 210 can provide one or more advertisements or other content.

In the system 200, one or more of the user devices 202 can be identified based on what applications or other software it has installed. For example, the user device 202A includes currently installed content 212 that runs on a suitable operating system 214. The currently installed content can include one or more applications 212A and/or one or more packages 212B, which can be bundles for installing an application or other software. The applications 212A and the packages 212B can include any type of software mentioned in the above description of information 102 (FIG. 1), for example.

The user device 202A here includes an identifier generating module 216. In some implementations, the device 202A uses the module 216 to generate a unique identifier for itself based on the content 212 that the device currently has installed. This can be considered a local generation of identifier; in an example below will be described a non-local generation of an identifier.

The identifier generating module 216 can perform collection and sorting of information. In some implementations, the module can collect any or all of the information 102 described above (FIG. 1). In some implementations, the module can query the operating system 214 to learn what the currently installed content 212 is. In some implementations, the module can query one or more protocol handlers (not shown) in the device 202A for relevant information. For example, the installed applications may have identifiable protocols that allow them to perform certain actions on the devices. From a list of such protocols installed applications can be determined. In some implementations, the installed content—e.g., mobile apps for one or more technology platforms of smartphones—can participate in a registration routine where the content reports to the device or to an external resource that the content has been installed. The module 216 can consult the record of such installation registrations to learn what content is installed on this particular device.

Having collected relevant information about the currently installed content 212, the identifier generating module 216 can process the information as part of generating the device identifier. In some implementations, the module 216 can sort the collected information in one or more ways. The information can be sorted alphanumerically, chronologically, by size, by category, by type, by manufacturer and/or by frequency of use, to name just a few examples.

The processing can involve hashing some or all of the information. In some implementations, the names of installed applications and packages can be hashed into one or more hash values, which are then used to generate the identifier for the device. For example, in situations where the order of information affects the resulting hash value(s), the information can be sorted in some particular way before the hashing. The information aspect used for sorting can be, but is not necessarily, present in the information that is to be processed. For example, in the information 102B (FIG. 1) the application/package names are sorted by the dates they were installed, and the installation date information (e.g., "Jan. 5, 1999" for the application/package Bcd in FIG. 1) may or may not be included when the hashing is performed.

The user device 202A can include an information providing module 218 that can provide one or more portions of information to another device or resource. In some implementations, the module 218 provides the generated identifier (e.g., a hash value) to the publisher system 206 and/or to the content distributor system 210. For example, this can be done as a form of identification when the device 202A is interacting with either system, such as when the device requests content (e.g., a page or an ad). The module 218 can provide the generated identifier when requested, and/or by its own initiative.

A generated identifier can be used for one or more purposes. For example, the system 200 can include a computer system 220 connected to the network 204 and/or to any other system or device. The computer system 220 can be configured to collect information about activities on the network, such as about consumption of content (e.g., from the system 206 and/or 210). The system 220 can include a network activity information repository 222 in which is collected knowledge about network activities, including, but not limited to, browsing sessions, page downloads, purchases, servings of ads or other content, clicks on ads or other content, or conversions. For example, the repository 222 can store information about content that was viewed and/or interacted with using the browser(s) 208.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

However, the network activity information 222 sometimes may not fully reflect the events on the network 204. For example, many users have multiple applications (e.g., mobile apps) installed on a single device, and sometimes switch between different apps while in the process of performing a common task. From the network perspective (e.g., as seen by the systems 206, 210 and/or 220), this can fragment what in actuality is a single user session into a number of seemingly unrelated threads.

The generated identifier can be used with the network activity information repository 222. In some implementations, the generated identifier—which can uniquely represent an individual user device based on its installed content—can be used as a seed for identifying events that belong to a common session. For example, if the user device 202A provides the same generated identifier (e.g., by way of the information providing module 218) in multiple different events, then the system 220, or another system, can use the common identifier to determine that it is indeed the same device involved in the different activities that have been registered.

An identifier can also or instead be generated elsewhere than on the device to which the identifier relates. In some implementations, the information providing module 218 can provide an information collection (e.g., a list) of the application names, package names, and/or other information that is relevant for identifier generation. For example, the application/package names can be collected on the device 202A and provided to the computer system 220.

The computer system 220 can include an identifier generating module 224 that can process the received information and generate an identifier. In some implementations, the module 224 can feed the received information to a hash function that produces one or more hash values. The information may or may not be sorted before such processing begins.

One approach involves generating an isolated fingerprint for each known package name. In some implementations, this can be done by generating a Bloom filter of all package names on the device. For example, the names of known packages can then be queried against the Bloom filter one at a time, to see if that package is included in the device's set of packages.

Figure 3:
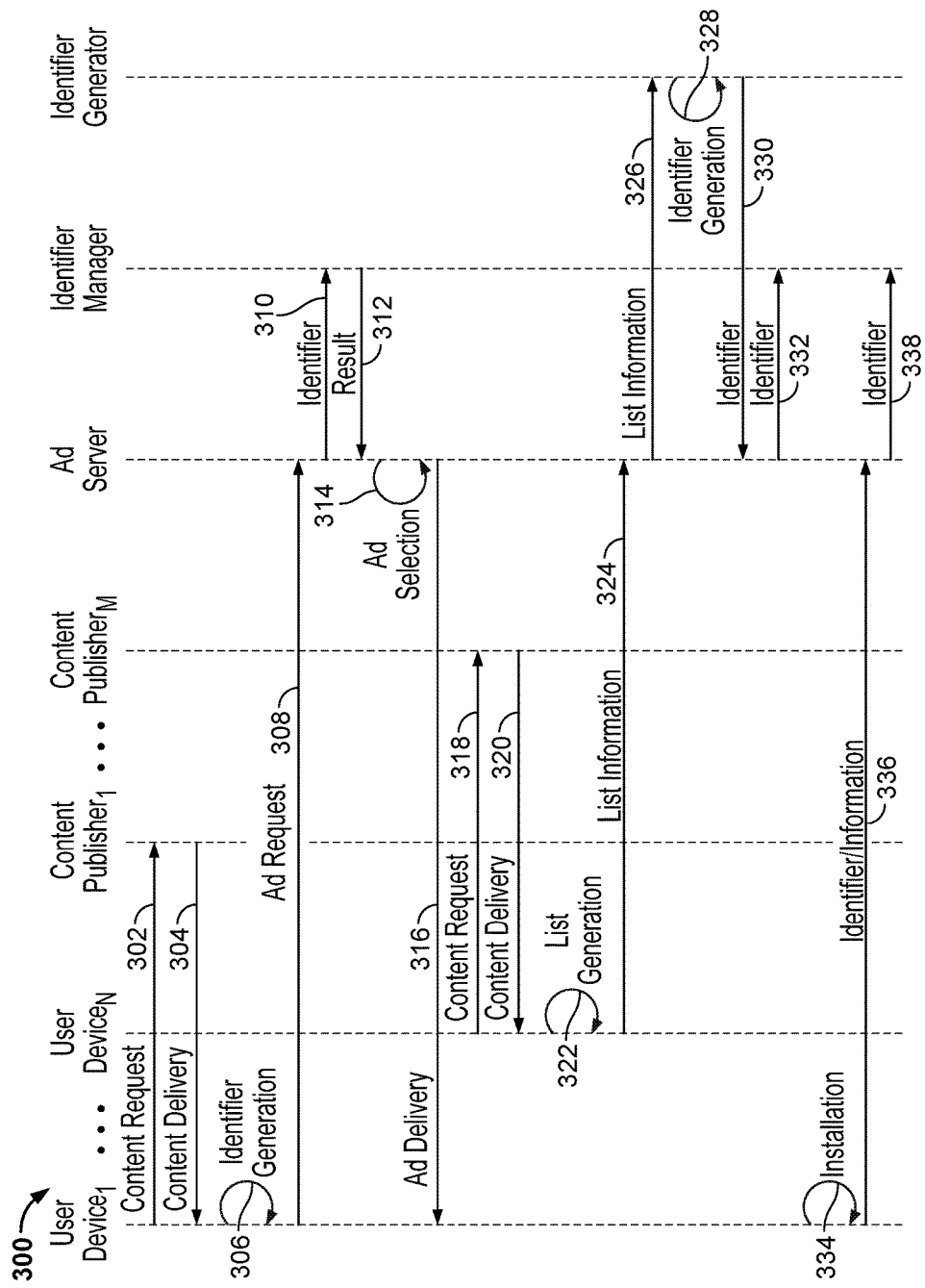
FIG. 3 shows an example of a process flow for generating an identifier for a device.

FIG. 3 shows an example of a process flow 300 for generating an identifier for a device. The process flow can be performed in one or more systems, by processor(s) executing machine-readable instructions. For example, the system 200 (FIG. 2) can be used in whole or in part.

The process flow 300 involves N number of user devices schematically indicated as user device$_1$ through user device$_N$, respectively, where N=1, 2, . . . . The process flow 300 involves M number of content publishers schematically indicated as content publisher$_1$ through content publisher$_M$, respectively, where M=1, 2, . . . . The process flow 300 involves at least one ad server or provider of other content. Finally, the process flow 300 involves an identifier manager and an identifier generator.

Operations 302-316 exemplify a request and delivery of content where the identifier is generated locally on the user device. At 302, user device$_1$ sends a content request to content publisher$_1$. For example, the user device$_1$ is requesting a particular resource (e.g., a web page). At 304, the content publisher$_1$ responds by delivering the requested content (e.g., the web page). At 306, the user device$_1$ generates an identifier for itself. At 308, the user device$_1$ sends a request for an ad or other content to the ad server or provider of other content. In this example, the request also includes the generated identifier. At 310, the ad server or provider of other content forwards at least the identifier to the identifier manager. In some implementations, the identifier manager uses the identifier as a seed to connect separate events as being part of a common session. For example, it can be determined whether the user device$_1$ has previously responded favorably (e.g., clicked on) to other content (e.g., an ad). At 312, the identifier manager provides a result to the ad server or provider of other content. At 314, an ad or other content is selected based on the available information. At 316, the ad or other content is provided to the user device$_1$.

Operations 318-332 exemplify a request and delivery of content where the identifier is generated elsewhere than on the user device. For clarity, some operations similar to those described in the previous example are mentioned here as well, while others are not repeated. At 318, user device$_N$ sends a content request to content publisher$_M$. At 320, the content publisher$_M$ responds by delivering the requested content. At 322, the user device$_N$ generates a list or other information collection regarding what applications/packages are installed on the device. At 324, the user device$_N$ provides the list or collection to the ad server or provider of other content. At 326, at least some of the received information is provided to the identifier generator. At 328, the identifier generator generates an identifier for the user device$_N$. At 330, the identifier is provided to the ad server or provider of other content. At 332, the identifier can be provided to the identifier manager. For example, a record of network activities can be updated with new information about the user device$_N$.

Operations 334-338 exemplify an update by a user device when there is a change in the installed applications/packages. For clarity, some operations similar to those described in the previous example are mentioned here as well, while others are not repeated. At 334, the user device$_1$ installs another application or package. The also generates a new identifier based on the new set of installations. At 336, the user device$_1$ provides the new identifier and/or information about the new installation to the ad server or provider of other content. For example, the user device$_1$ can in effect communicate that "this is the new identifier for user device$_1$." At 338, the new identifier is provided to the identifier manager to update one or more records. Registering the newly generated identifier allows for continuity when the installed set of applications/packages changes. For example, earlier network activities by the user device$_1$ (e.g., visiting a certain web page) that were associated with the old identifier can now be taken into consideration when content (e.g., an ad) is to be provided to the same device having the new identifier.

An identifier can be reset for one or more reasons. One purpose of a hash function can be to protect sensitive user information while still maintaining the uniqueness of the data. In some implementations, the identifier manager can then reset the identifier when appropriate. As more information is added to the source—to make it more unique and less likely to collide—it may become more trivial to guess or positively identify the user. For example, with periodic reporting by the user device, each new identifier can be seen as a mutation of the information on which the identification is based, and with each mutation the probability of correctly identifying the user device (i.e., to distinguish it from other devices) may decrease.

The following example relates to how a device ID can change when a device goes through variations in the set of installed applications. In implementations where a hash is performed on the installed applications (optionally with other information), installing new applications will change the hash value (device ID) that the function generates. The hash function can be chosen such that a small change will only have a small effect in the resulting hash. For example, the change in the hash value can be small when only one application is added or removed.

The following can apply in a particular implementation:
Installed application identifiers: A, B, C, D
Hash-Function to get device ID: $h(x)=sum(num(x))$, where e.g., $num(A)=1$, $num(B)=2$ . . . $h(A,B,C,D)=10$
Similarity function: $s(y,z)$ where y and z are results of hash functions=$s(y,z)=1$ if $y=z$ or $y+/-y/2=z$ and 0 else In the above example, each installed application is given a number and the hash function computes the sum thereof. Two separate device IDs are then deemed to match (i.e., the similarity function is 1) if one of the hash numbers is 50-150% of the other hash number. That is, the source for the hash function in this example is numerical IDs pre-assigned to each application.

In another implementation, the source for the hash function can instead be a list. For example, the order of installations can be taken into account so as to distinguish, say, a device where first the Angry Birds game and thereafter Solitaire were installed, from another device where those two applications were installed in the opposite order. In some implementations, installation dates are taken into account. For example, the respective dates when applications first appeared on the device can be used to distinguish that device from another one that has the same installed programs.

That is, choosing the right hash function can make the addition of one application have a small impact, while having a different set of applications makes a big impact. A similarity function is used that compares two or more hashes, for example based on knowledge of the hash function. In some implementations, the device IDs take into account timestamps and/or other parameters. For example, this can help minimize the impact of small changes on the hash value while a separate set of applications will have a big effect on the hash value and therefore will result in a non-similarity.

The following example relates to when a device ID reaches a threshold where there is too little probability of correctly identifying the device. This determination involves similarity. If nothing on the device changed, the hash value will be exactly the same and proving similarity is then trivial (with some error in case two people have identical setups). If the system receives a new hash value that according to the similarity function is very similar to an earlier hash value those two hash values will be associated with each other. The next hash value coming in will be compared to the latest known hash value for each device. Changes in a device can therefore be chained.

In some implementations, the threshold can be selected based on observing the system run for a while. Installing one application will likely result in a small enough change that one can confidently enough still recognize the device. On the other hand, if five applications and other criteria are changed at once on a device that has ten installed applications, this will likely result in no match being detected. However, history can be taken into account. If the user installs five applications over the course of a day and the system receives a hash value in between each installation, a similarity between the individual hash values can be determined. On the other hand, if the system does not receive hash values between the installations, it will likely lose that session (i.e., fail to recognize that it is the same device involved). As a counterexample, if a user has 200 applications installed, the design of the hash function likely is more robust against a change of merely five applications since it is such a small portion of the whole.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A method for identifying a mobile device, the method comprising:
identifying, by a first mobile device, a first plurality of applications installed on the first mobile device;
identifying a name and an installation date of each of the first plurality of applications;
calculating a first clock skew of the first mobile device relative to a reference clock;
generating a first identifier for the mobile device based on hashing the name and the installation date of each of the first plurality of applications installed on the first mobile device and based on hashing the calculated first clock skew;
transmitting, by the mobile device to a server, a data request and the generated first identifier for the first mobile device; and
receiving, by the mobile device, data, the data determined by the server based on the server determining a second identifier generated by a second mobile device with a second plurality of applications installed on the second mobile device does not match the first identifier because the second mobile calculated a second clock skew and the second identifier was generated based on the name and the installation date of each of the second plurality of applications installed on the second mobile device and based on the calculated second clock skew, wherein names of the second plurality of applications are the same as the identified names of the first plurality of applications.

2. The method of claim 1, the method further comprising substituting the generated first identifier for a previously stored identifier for the first mobile device.

3. The method of claim 2, further comprising generating a new identifier for the first mobile device responsive to a change in installed applications on the first mobile device.

4. The method of claim 1, wherein generating the first identifier for the mobile device is further based on hashing package versions of each of the first plurality of applications.

5. The method of claim 1, wherein the name of each of the first plurality of applications is sorted by an installation order of each of the first plurality of applications prior to the hashing.

6. The method of claim 1, wherein the name of each of the first plurality of applications is sorted by installation dates of each of the first plurality of applications prior to the hashing.

7. The method of claim 1, wherein the name of each of the plurality of applications is sorted by alphanumeric order of each of the first plurality of applications prior to the hashing.

8. The method of claim 1, wherein the first plurality of applications includes all applications installed on the first mobile device.

9. The method of claim 1, further comprising:
determining a numerical value of a previously stored identifier for the first mobile device is within a predetermined percentage of a numerical value of the generated identifier.

10. A method for identifying a device comprising:
identifying, by a first mobile device, a first plurality of applications installed on the first mobile device;
identifying a name and an installation date of each of the first plurality of applications;
generating a first sorted list comprising a concatenation of the names of each of the first plurality of applications, sorted in a first order of the respective installation date of each of the first plurality of applications;
generating a first identifier for the first mobile device comprising a hash of the first sorted list;
transmitting, by the first mobile device to a server, a data request and the generated first identifier for the first mobile device; and
receiving, by the first mobile device from the server, data, the data determined by the server based on the server determining a second identifier generated by a second mobile device with a second plurality of applications installed on the second mobile device does not match the first identifier because the second mobile device generated a second sorted list sorted in a second order of the respective installation date of each of the second plurality of applications, wherein names of the second plurality of applications are the same as the identified names of the first plurality of applications.

11. The method of claim 10, further comprising generating a new identifier responsive to addition or removal of an application from the first mobile device by generating a second list of the first plurality applications in a third order by sorting the information associated with the first plurality of applications adjusted based on the addition or removal of the application by installation date and providing the generated new identifier.

12. The method of claim 11, further comprising indicating that the generated new identifier replaces the generated first identifier.

13. The method of claim 10, further comprising determining package versions of each of the first plurality of applications and using the determined package versions to generate the first identifier.

14. The method of claim 10, wherein the first order is instead the identified name of each of the first plurality of applications in alphanumeric order.

15. The method of claim 10, further comprising determining a clock skew of the first mobile device relative to a reference clock and using the determined clock skew in generating the first identifier.

16. The method of claim 10, wherein the first plurality of applications includes all applications installed on the first mobile device.

17. A non-transitory computer-readable storage medium comprising instructions that when executed by a processor perform a method for generating an identifier for a mobile device, the method comprising:
identifying, by a first mobile device, a first plurality of applications installed on the first mobile device;
identifying a name and an installation date of each of the first plurality of applications;
generating a first sorted list comprising a concatenation of the names of each of the first plurality of applications, sorted in a first order of the respective installation date of each of the first plurality of applications;

generating a first identifier for the first mobile device comprising a hash of the first sorted list;

transmitting, by the first mobile device to a server, a data request and the generated first identifier for the first mobile device; and receiving, by the first mobile device from the server, the data, the data determined by the server based on the server determining a second identifier generated by a second mobile device with a second plurality of applications installed on the second mobile device does not match the first identifier because the second mobile device generated a second sorted list sorted in a second order of the respective installation date of each of the second plurality of applications, wherein names of the second plurality of applications are the same as the identified names of the first plurality of applications.

* * * * *